United States Patent Office.

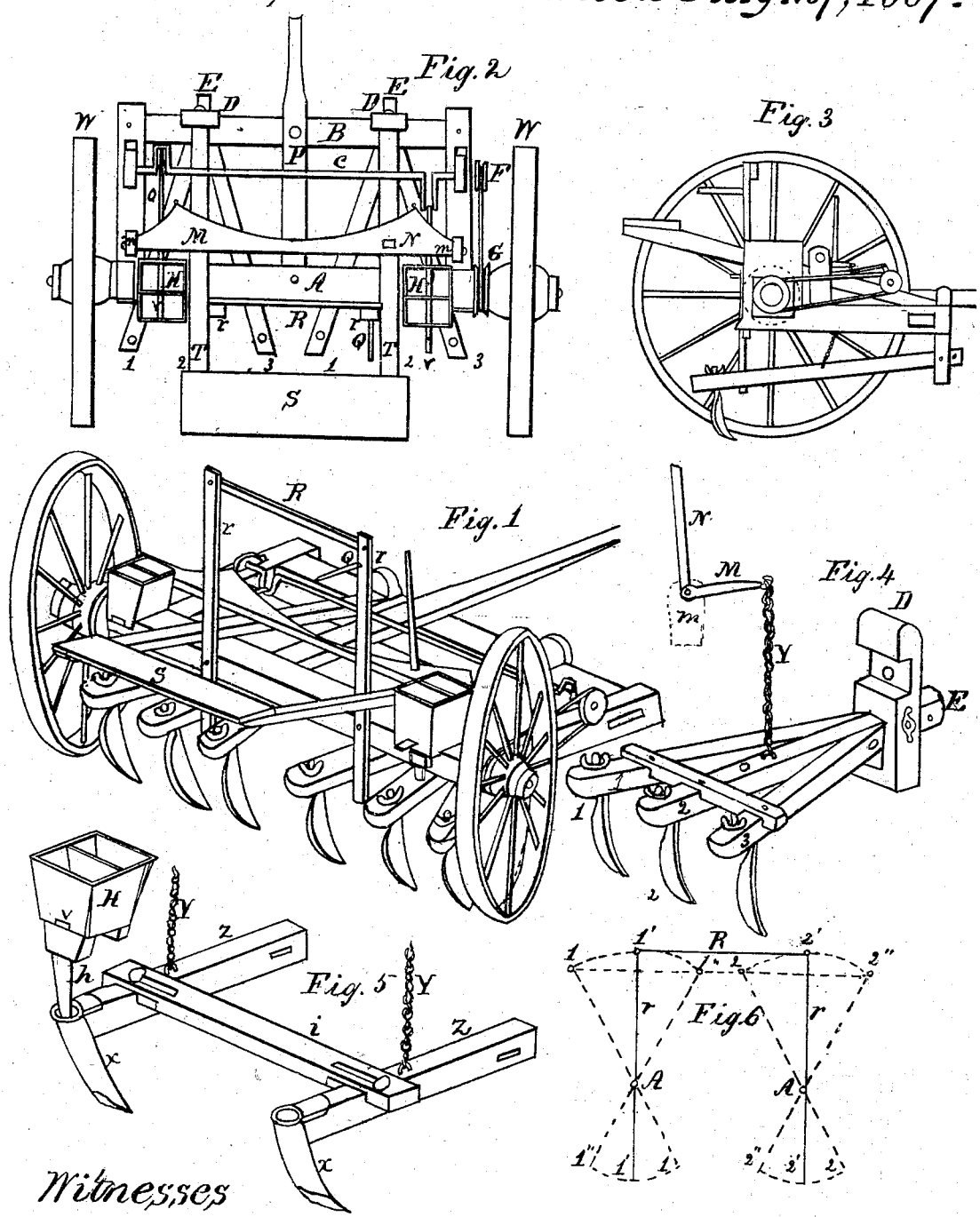

REUBEN N. EBY, OF UPPER LEACOCK TOWNSHIP, PENNSYLVANIA.

*Letters Patent No. 68,056, dated August 27, 1867.*

---

IMPROVEMENT IN CULTIVATORS.

---

*The Schedule referred to in these Letters Patent and making part of the same.*

---

TO ALL WHOM IT MAY CONCERN:

Be it known that I, REUBEN N. EBY, of Upper Leacock township, in the county of Lancaster, and State of Pennsylvania, have invented a new and useful Improvement on a Cultivator and Seeder Combined; and I do hereby declare that the following is a full, clear, and exact description of the construction and operation of the same, reference being had to the annexed drawings, making a part of this specification, in which—

Figure 1 is a perspective view of my cultivators attached.

Figure 2, a top or plan view of the same.

Figure 3, a side elevation.

Figure 4, one of the cultivators with chain, lever, and forward attachment shown.

Figure 5, the scoring-shovels to replace the cultivators, for planting two rows of corn.

Figure 6 illustrates the action of my shifting-levers for moving the cultivators simultaneously to the right or left.

The nature of my invention consists in providing a cultivator to operate on each side of the row, and so under command that if the horses deviate in their walk, as they usually do, the driver has full view of the corn, and the cultivators can be guided so as not to be drawn into the row nor too far from it on the other side, finishing a row and a half (or rather two halves) at a time, and also, by making a simple change, using the implement or machine for scoring and planting.

To enable others skilled in the art to make and use my invention, it is only necessary to inspect the drawings, which clearly show its general features, which I will more fully proceed to explain.

I claim no novelty in the two-wheeled carriage or truck, with the seed-hoppers, crank, and pulley arrangement in itself considered, nor in the plan of my cultivators, with or without scrapers, harrow-teeth, or the like. Such cultivators, of various forms, are common.

The novelty of my invention consists in the application of two separate cultivators (fig. 4) to an adjustable bracket, D, on the forward cross-piece B of a two-wheeled truck, the central beam 2 passing through a slot, in which it has play, by its prolonged end E, and is held by a headed screw-bolt and nut, as shown by fig. 4. A vertical lever, N, on a horizontal lever, M, to which a chain is fixed by a hook, and connected with the central beam of the cultivator on each side for raising them out of the soil. I also have a compound lever, that is, two vertical rods, $r$, extending down between the beams of the cultivators and rising upwards, and connected by a cross-piece, R, on pivots. These uprights are held each by a pivot on the rear of the axle A. Their action is illustrated by fig. 6. The dotted lines show their motion to the right and left for shifting the cultivators, with which the lower ends of $r$ come in contact. The driver, seated on S, with the handle Q of the pivoted lever at hand, can clearly see the row of corn beneath him, and effectually guide the cultivators, no matter how much the horses deviate from a straightforward path between the rows, drawing the adjusted cultivators and keeping them in line, thereby making more uniform and better work; and found to be truly a desirable feature in the field; my truck being provided with a strap-pulley, G, on the axle of the wheel adjoining the hub, and a crank-rod, $c$, with reversed crank-loops and strap-pulley F, together with connecting-rods D, slide-valves V, double hoppers H, with elastic hose $h$. These may be a fixture, and are by no means in the way of the cultivator, (or the hoppers may be easily removed by drawing the screw-bolts.)

When it is desirable to score and plant, it is only necessary to remove the cultivators, shift the brackets D to the outer holes, and connect the scoring-boots, (fig. 5,) adjust the hose or tube $h$, and belt for the pulleys, and the machine is ready for scoring and planting two rows of corn at one operation. As a corn-planter, in itself considered, it may present no special novelty, except so far as the boots or shovels $x$ on the beams $z$, and slotted cross-piece $i$, and its application to the brackets D is concerned, as a new arrangement of parts.

What I deem novel is the mode of operating two separate cultivators by means of the levers R $r$ $r$, and the facility of converting the machine into a planter, and for performing the office of scraper, harrow, and cultivator without a complex or expensive alteration, and to furnish the farmer with an implement that is greatly needed for making neat and good work. When the corn is small I employ a simple harrow-tooth in the beam next the row, on each cultivator, instead of the shovels, which throw more soil than is needed when the corn is yet small.

What I claim as my invention, and desire to secure by Letters Patent, is—

1. The combined levers R $r\ r$, as constructed and arranged, for shifting two cultivators in unison, for the purpose and substantially in the manner specified.

2. In combination with my combined shifting-levers R $r\ r$, I also claim the application of two separate cultivators, attached to adjustable brackets D, beneath a two-wheeled truck, substantially in the manner and for the purpose specified.

3. In combination with my adjustable brackets D, I claim the arrangement of the combined adjustable scorers $x\ x$ on the frame $z\ i$, when constructed and applied in the manner and for the purpose specified, together with the use of the hoppers, crank, and pulleys, all combined substantially in the manner shown and set forth.

REUBEN N. EBY.

Witnesses:
WM. B. WILEY,
JACOB STAUFFER.